United States Patent
Green et al.

[11] Patent Number: 6,008,900
[45] Date of Patent: Dec. 28, 1999

[54] METHOD AND APPARATUS FOR CALIBRATION OF A MULTI-CHANNEL FIBER OPTIC INTERFEROMETRIC SENSOR SYSTEM IN A SIGNAL PROCESSING SYSTEM

[75] Inventors: James D. Green, Newbury Park; Lawrence J. Hershman, Winnetka; Kevin R. Wagg, Simi Valley, all of Calif.

[73] Assignee: Litton Systems, Inc., Woodland Hills, Calif.

[21] Appl. No.: 09/074,781

[22] Filed: May 8, 1998

Related U.S. Application Data

[60] Provisional application No. 60/074,273, Feb. 10, 1998.
[51] Int. Cl.$^6$ ................................................ G01B 9/02
[52] U.S. Cl. ................................. 356/345; 250/227.27
[58] Field of Search ................... 356/345; 250/227.19, 250/227.27; 385/12, 14

[56] References Cited

U.S. PATENT DOCUMENTS

4,789,240  12/1988  Bush ........................................ 356/345

*Primary Examiner*—Samuel A. Turner
*Attorney, Agent, or Firm*—Price, Gess & Ubell

[57] ABSTRACT

A calibration technique for lasers of a data acquisition module in a signal processing system, wherein an optimal value of a phase modulation coefficient is calculated for each laser and used as the amplitude of a cosine wave signal for the laser module carrier frequency for phase modulation of the laser output signal. The phase modulation coefficient is determined from a global average I/Q ratio, calculated for all channels of the selected laser module, as an average of all I/Q ratios of in-phase and quadrature phase angle components of the signals returned from the sensors. The phase modulation coefficient for the selected laser module is determined empirically or by dividing the previously determined phase modulation coefficient by the previously determined global average I/Q ratio.

13 Claims, 11 Drawing Sheets

METHOD AND APPARATUS FOR CALIBRATION OF A MULTI-CHANNEL FIBER OPTIC INTERFEROMETRIC SENSOR SYSTEM IN A SIGNAL PROCESSING SYSTEM

CROSS-REFERENCE TO RELATED APPLICATIONS

This application is a continuation of provisional application Ser. No. 60/074,273 filed on Feb. 10, 1998 for "METHOD AND APPARATUS FOR CALIBRATION OF DIGITAL DOWN CONVERTER IN A SIGNAL PROCESSING SYSTEM."

This application is also related to application Ser. No. 09/021,014, filed on Feb. 10, 1998, for "METHOD AND APPARATUS FOR INTERROGATION OF FIBER OPTIC INTERFEROMETRIC SENSORS IN MULTI-CHANNEL APPLICATIONS," assigned to the assignee of the present invention, and application Ser. No. 09/021,557, filed on Feb. 10, 1998, for "METHOD AND APPARATUS FOR CALIBRATION OF DIGITAL DOWN CONVERTERS IN A SIGNAL PROCESSING SYSTEM," assigned to the assignee of the present invention.

BACKGROUND OF THE INVENTION

1. Field of the Invention

The present invention relates generally to the field of signal processing, and more specifically to a method and apparatus for calibration of a multi-channel fiber optic interferometric sensor system in a signal processing system.

2. Description of Related Art

Acoustic listening systems for underwater applications are well known in the art. They are typically equipped with arrays of acoustic sensors which provide sensitive underwater listening capabilities and may provide relative position information. Each sensor reacts to an incoming pressure wave by modulating an input signal and the outputs of all the sensors are processed to determine the sound and position information. These sensor arrays are generally either attached to the submarine hull or are towed behind the submarine. Ideally, the sensors would be attached to the submarine hull, but prior art acoustic sensors were too heavy for many submarine applications. Recent advances in acoustic sensor array technology, however, have produced arrays which are light enough to be mounted on a submarine hull and which still provide very sensitive signal response. This weight reduction has also allowed the number of sensors to be increased.

Another application for underwater acoustic sensors is in the geological survey industry, specifically, for underwater oil exploration. Vast arrays of sensors may be placed on the ocean bottom in the vicinity of known oil reserves. A surface ship initiates an acoustic pressure wave with a large air burst. The acoustic pressure wave and its reflection off the ocean floor are detected by the sensor arrays. The data from the sensors is then processed and analyzed to determine optimum drilling locations or to monitor the status of known reservoirs.

As the number and complexity of the acoustic sensors in these and related applications have increased, the associated signal processing electronics modules have likewise increased. Typical conventional systems use analog circuitry to interrogate the sensors, but these analog systems are subject to drift and it is very difficult to accurately calibrate them. Recent developments have provided fiber optic interferometric sensors, as described in the article "Homodyne Demodulation Scheme for Fiber Optic Sensors Using Phase Generated Carrier" by Anthony Dandridge, Alan B. Tveten, and Thomas G. Giallorenzi, IEEE Journal of Quantum Electronics, Vol. QE-18, No. 10, October 1982, incorporated herein by reference. This reference teaches a modulation/demodulation technique in which the frequencies of I and Q components are different, which is employed in the present invention.

Figure 1:
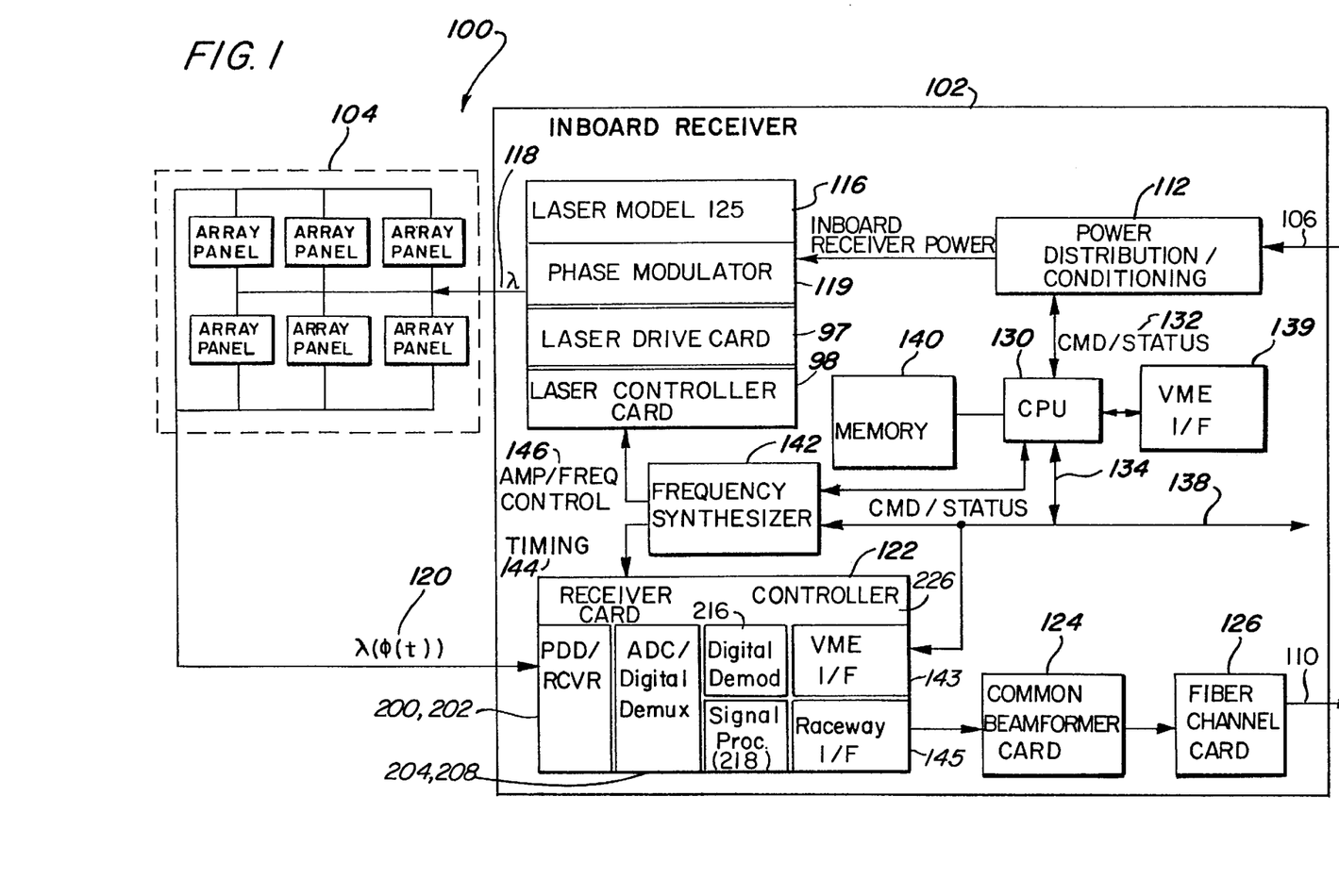
FIG. 1 is a high-level block diagram of a signal processing system with digital demodulation circuit used with the present invention.

The above-mentioned related patent applications describe techniques for interrogation of fiber optic interferometric sensors in multi-channel applications and for fine tuning of a receiver card 122 by calibration of digital down converters of the signal processing system 100 of FIG. 1. The signal processing system 100 is comprised of a source end with lasers, sensors and control electronics, and a receive end. The sensors are located in-between the source end and receive end as part of the outboard telemetry. The sensors are fiber optic sensors which get the information from the environment sensed by the fiber optic interferometers. The optical fiber interferometer has a reference fiber and a signal fiber. A relative optical phase shift between these two fibers is the information returned by the telemetry and extracted by the receive end.

FIG. 1 is a high-level block diagram of the signal processing system 100. An inboard receiver module 102 containing the requisite electronic control and processing circuitry is located inside the submarine. A lightweight array of fiber optic interferometric sensors 104 is located on the outside hull of the submarine. Each sensor in the array reacts to an incoming acoustic pressure wave by phase modulating a light signal 118 sent from a laser module 116 of the inboard receiver module 102. Modulated signals from different sensors, each operating at a different carrier frequency, are passively multiplexed onto a single fiber optic cable return signal 120 and sent back to the receiver 102. The channel signals are then demultiplexed and demodulated by the receiver 102.

The inboard receiver 102 is connected to the submarine's power system (not shown) via a power connection 106. The inboard receiver 102 has a power distribution and conditioning block 112 to provide the necessary power requirements for the receiver components. Each input light signal 118 is generated by the corresponding laser module 116. Each laser module includes a laser 117, a phase modulator 119, a laser driver card 97 and a laser controller card 98. The laser 117 used in the preferred embodiment is a Model 125 200 mW Nd:YAG laser, available from Lightwave Electronics of Palo Alto, Calif. The phase modulator 119 is preferably a lithium niobate phase modulator.

Figure 2:
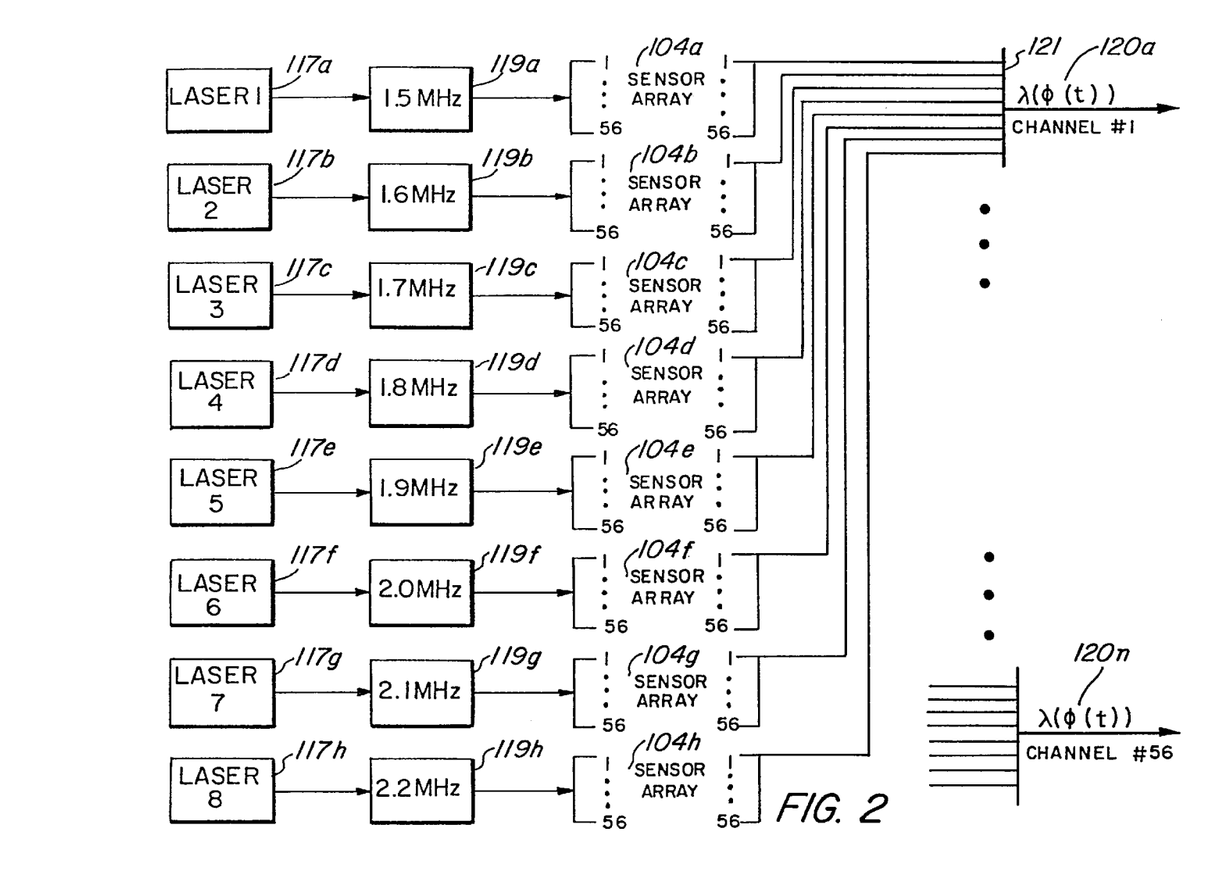
FIG. 2 is a block diagram illustrating a preferred configuration for an inboard receiver with laser modules driving sensor arrays.

As shown in FIG. 2, eight laser modules with eight lasers 117a–117h drive eight corresponding sensor arrays 104a–104h. Each laser 117 powers 56 sensors (channels), typically 28 channels on each side of the submarine. The laser 117 crystal is heated with the temperature level provided from a frequency synthesizer 142 (FIG. 1). The frequency synthesizer 142 controls the temperature of each laser 117 crystal separately, as is well known in the art, to produce laser outputs with eight different "colors" i.e., different wavelength nominally at 1319 nanometers, which are provided to the corresponding phase modulator 119a–119h.

On their way back to the receive end of the inboard receiver 102, all first channel outputs from each sensor array 104 are multiplexed together via a signal multiplexer 121. This is repeated for all the other 55 channels. Therefore, 56 fiber optic cable return signals 120 return from the sensor array 104, with each fiber carrying eight multiplexed signals. The multiplexed signal is then processed by a receiver card 122 (FIG. 1). Depending upon the number of sensors used, several receiver cards 122 may be needed.

The frequency synthesizer 142 contains the master system clock and controls the operation of the laser module 116 by defining laser parameters, such as laser color, power, and temperature, provided to the laser module 116 on an amp/freq control line 146. The timing information is provided to the receiver card 122 via a signal timing line 144. A CPU 130 and an associated memory 140 provide system level control and status information to the component of receiver 102 via data lines 132, 138, 141. The CPU 130 has a VME interface 139, attached to a VME bus 138, which exists between the CPU 130 and the receiver card 122. The CPU 130 is connected to the frequency synthesizer 142 via a data line 141.

The receiver card 122 demultiplexes and demodulates the return signal 120 and outputs a signal to a beamformer card 124 which provides additional signal processing. A fiber channel card 126 provides the signal information to an external fiber bus 110. Each receiver card 122, processes the signals from 7 fiber return signals 120, wherein each fiber has eight laser channels, or a total of 56 channels from eight different sensor arrays 104.

Figure 3:
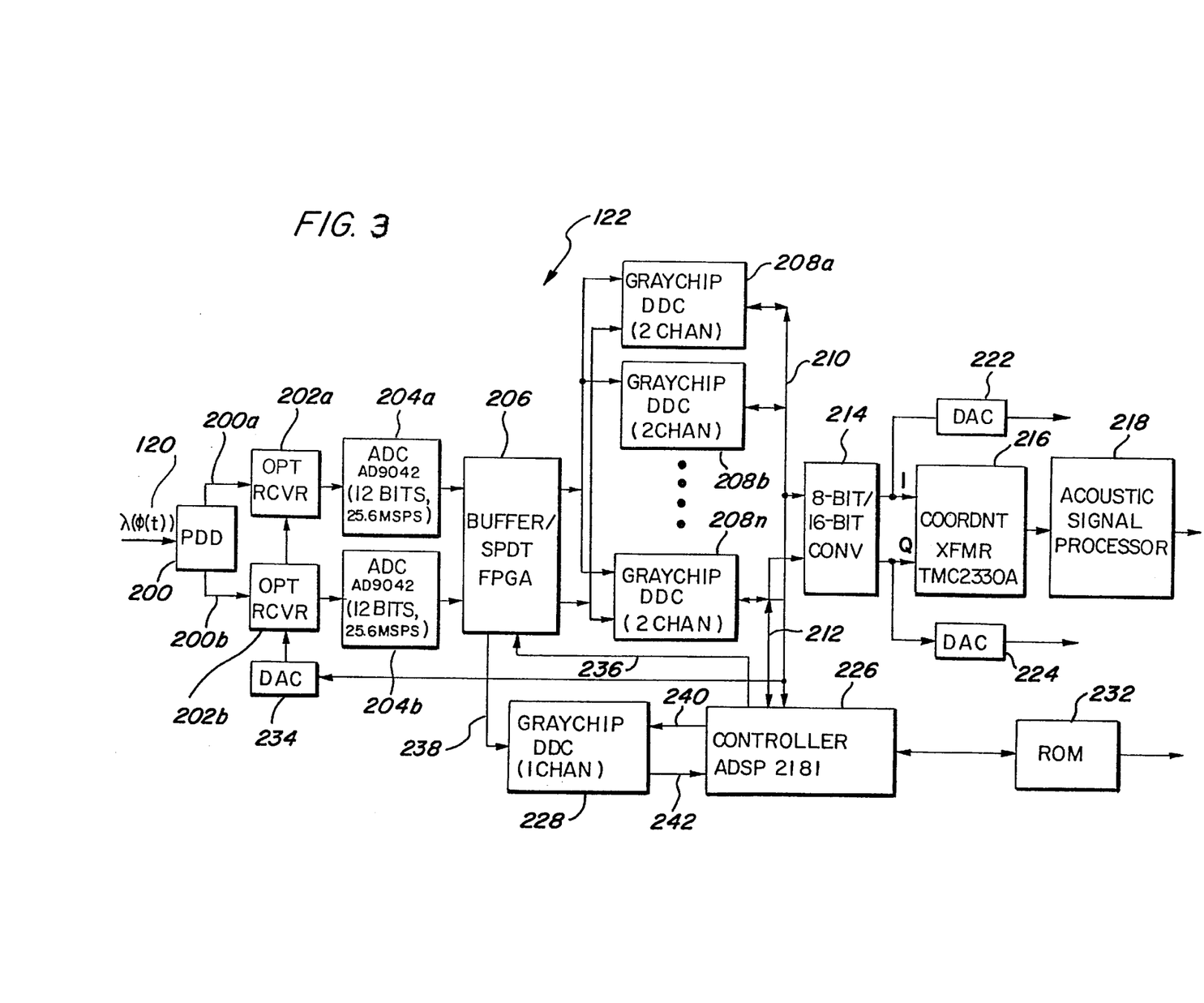
FIG. 3 is a detailed hardware block diagram of the receiver of FIG. 1.

FIG. 3 is a detailed block diagram of the receiver card 122 shown in FIG. 1. The return signal $\lambda(\phi(t))$ 120, containing 8 channels, output by the acoustic sensor array 104 is input into a polarization diversity detector (PDD) 200. An example of a PDD which has three outputs is described in U.S Pat. No. 5,448,058, entitled "OPTICAL SIGNAL DETECTION APPARATUS AND METHOD FOR PREVENTING POLARIZATION SIGNAL FADING IN OPTICAL FIBER INTERFEROMETRIC SENSOR SYSTEMS." In the preferred embodiment, a bi-cell or a two-output PDD is used. The PDD 200 and some other elements of the receiver card 122 prevent polarization signal fading in the return signal 120. The PDD 200 converts the photonic energy of the optical fiber return signal 120 into two separate electrical currents 200a, 200b via two photodiodes.

In each opto-receiver 202a, 202b a transimpedance amplifier converts the input current to a voltage, and a variable gain amplifier sets the voltage level in order to maximize the signal-to-noise level and to ensure that the voltage level is below the saturation level of ADCs 204a, 204b. Anti-aliasing filters in the opto-receivers 202a, 202b are used to filter the signal which then passes to the ADCs 204a, 204b, where the analog outputs of the opto-receivers 202a, 202b are digitized by high speed (>=25.6 MSPS), high resolution (>=12-bit) analog-to-digital converters (ADCs) 204a, 204b. The ADC used in the preferred embodiment has the part number 9042, and is manufactured by Analog Devices, Inc.

The number of ADCs used is directly dependent upon the number of outputs from the PDD 200. Typically, there are two outputs, but three are possible. At this point, the digitized output contains a complex signal comprised of all channels on the return optical fiber return signal 120, which are the frequency division multiplexed phase generated carriers with the information-carrying sidebands.

Each ADC 204a, 204b output is buffered and passed through to a multi-throw, multi-pole bus switch 206 which taps into each ADC 204a, 204b signal path. One output of the bus switch 206 goes to a digital down converter (DDC) 228, via signal path 238, which is employed as part of a calibration channel, as described below. The outputs of the bus switch 206 go to the signal channel DDCs 208a, 208b, 208n. The purpose of the bus switch 206 is to allow each of the DDCs 208 to be able to connect to any ADC output. This is required by the PDD 200 selection algorithm, discussed below with reference to FIG. 7.

Each DDC 208a, 208b, 208n acts as a digital demultiplexer by performing mix down and filtering of the digital information, separating one channel out of the composite signal. The DDC chip employed in the presently preferred embodiment is the GC4014 chip manufactured by Graychip, Inc. This particular device has 2-channel capability. In other embodiments, each chip may only have ½ or 1-channel capability. The number of DDCs needed depends upon the number of channels used in a given application. For example, if the return signal 120 has 8 multiplexed channels, then 4 2-channel DDC chips are needed. In the present embodiment, 28 2-channel DDCs (56 channels) are used per receiver card 122, but only one calibration DDC 228 and receiver card controller 226 are required, as described below. Thus, seven channel groups are needed to process all 56 multiplexed signals, with 8 channels per multiplexed array output signal.

Each DDC 208a, 208b, 208n outputs both in-phase (I) and quadrature phase (Q) data words that represent the rectangular components of the phase signal from the bus switch 206. These I and Q components from the DDCs 208a, 208b, 208n are time division multiplexed (TDM) onto separate I and Q buses. The I and Q components which define the same phase angle do not have the same frequency in the present invention. They are harmonics of the same frequency and one of these components is usually on the fundamental frequency and the other is on the first harmonic frequency. The output signal paths 210, 212 (which may be serial, unidirectional data paths or bi-directional data paths) output the I and Q 8-bit data words to a buffer 214 which buffers the words and also converts the 8 bit words into 16 bit words.

The I and Q words from all of the DDCs 208 in a time sequence are then demodulated. The I and Q words are converted from Cartesian to polar form by the coordinate transformer 216 to obtain the magnitude and the phase angle in polar coordinates. The coordinate transformer 216 of the preferred embodiment is a TMC2330A chip manufactured by Raytheon Corp., but may be any similar device.

The output of the coordinate transformer 216 is the instantaneous phase angle, whose change is directly related to the change in acoustic pressure of the acoustic signal from the environment, and whose rate of change is directly related to the frequency of the acoustic signal from the environment for a given fiber optic sensor. The channel-by-channel instantaneous phase angles are further processed in an acoustic signal processor 218, with integration and filtering algorithms, which is also attached to the VME bus 138. Tie output of the acoustic signal processor 218 may then be provided to a visual display, an oscilloscope, or to some other signal processing blocks, as desired. Two DACs 222, 224 provide I and Q signals which can be used for testing or viewing the output signal.

The calibration procedure described in the above-mentioned patent application U.S. Ser. No. 09/021,557 uses the receiver card 122 fine tuning loop for calibration of the receiver card 122 components. For that purpose the output 238 of the bus switch 206 is used to feed the calibration channel DDC 228. If there is more than one PDD 200, there will be more than one bus switch 206 feeding the calibration channel DDC 228, in a TDM manner. The calibration channel DDC 228 is set to mimic each signal channel in turn. The calibration channel provides a way to check PDD output selection, phase shift adjustment and I/Q balance on a per signal channel basis in a non-obtrusive way. For that purpose, the data is processed by the DDC 228 into I and Q words similar to the output of the signal channel DDCs 208a, 208b, 208n. The I and Q words are then processed by the receiver card controller 226 (a digital signal processor with its own RAM and ROM 232 memory) to extract the information necessary to determine channel performance. The receiver card controller 226 of the preferred embodiment is a ADSP 2181 manufactured by Analog Devices, Inc.

Figure 4:
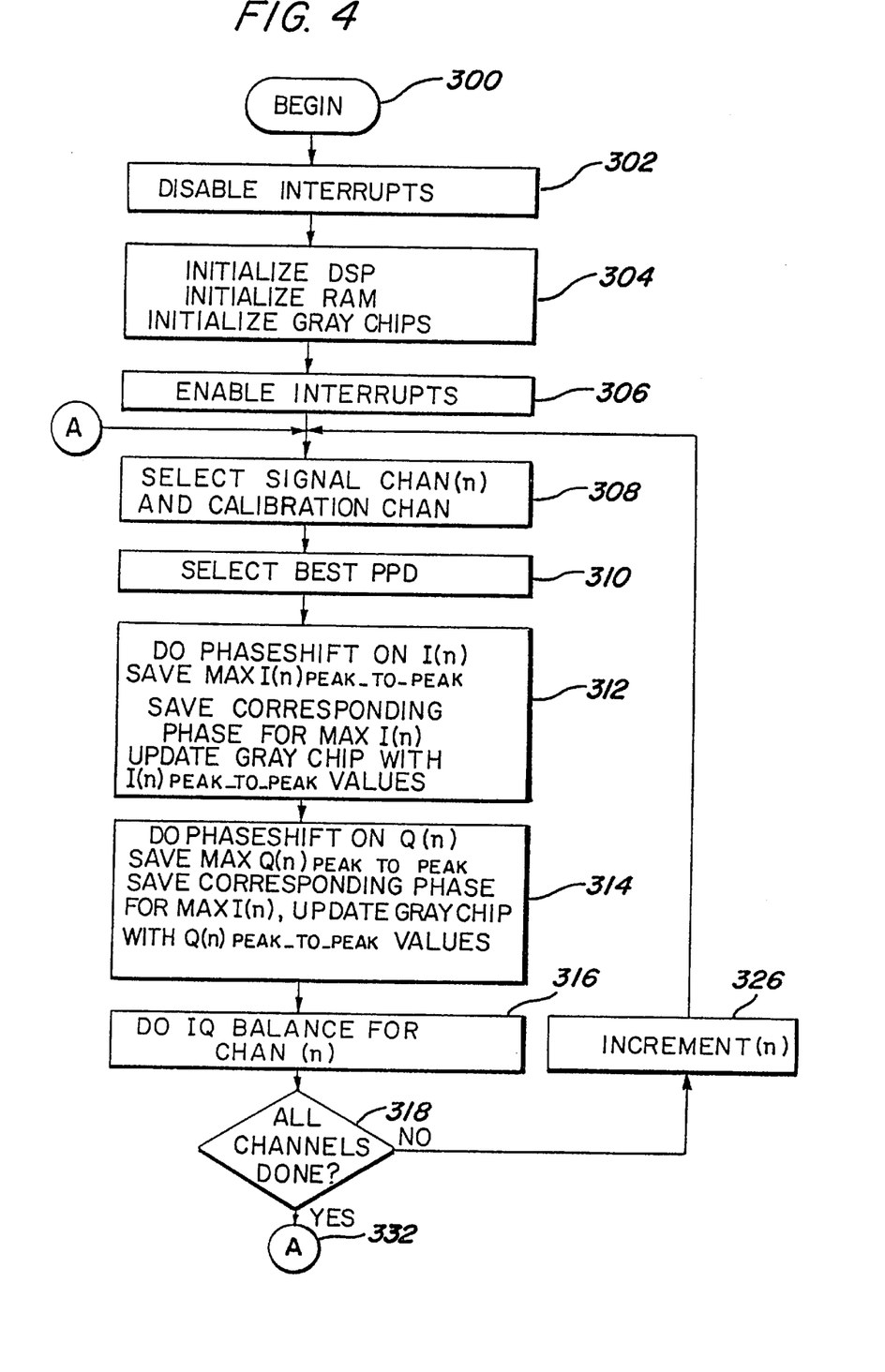
FIG. 4 is a flowchart illustrating the operation of the system controller.

The operation of the receiver card controller 226 is described with reference to the flowchart of FIG. 4. The following steps are performed by software which is either stored in the system controller's ROM 232 or is downloaded by the system CPU 130 to the signal processor 226 DSP RAM upon system initialization. Upon power initialization or a system re-initialization 300, all interrupts are disabled at step 302. The receiver card controller 226 digital signal processing unit (DSP) is initialized at step 304, along with any associated RAM memory and the DDCs 208. The interrupts are then enabled at step 306. A signal channel and a calibration channel are selected at step 308. Then, the best PDD signal is selected at step 310 by making the ADC selection for each signal channel. This PDD selection step is further described below with reference to FIG. 7.

Figure 5:
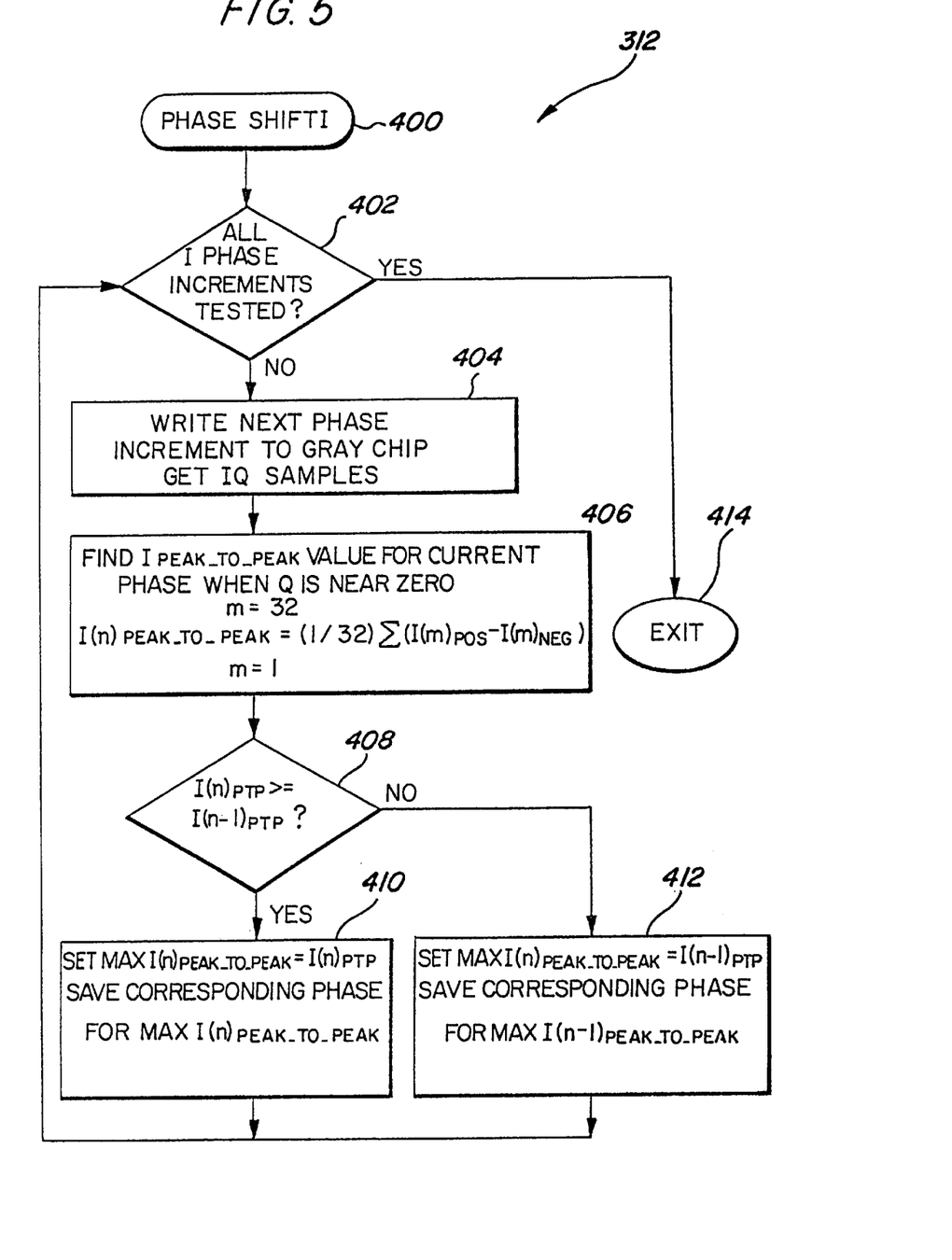
FIG. 5 is flowchart illustrating the phase shift algorithm for the inphase signal (I data)
Figure 6:
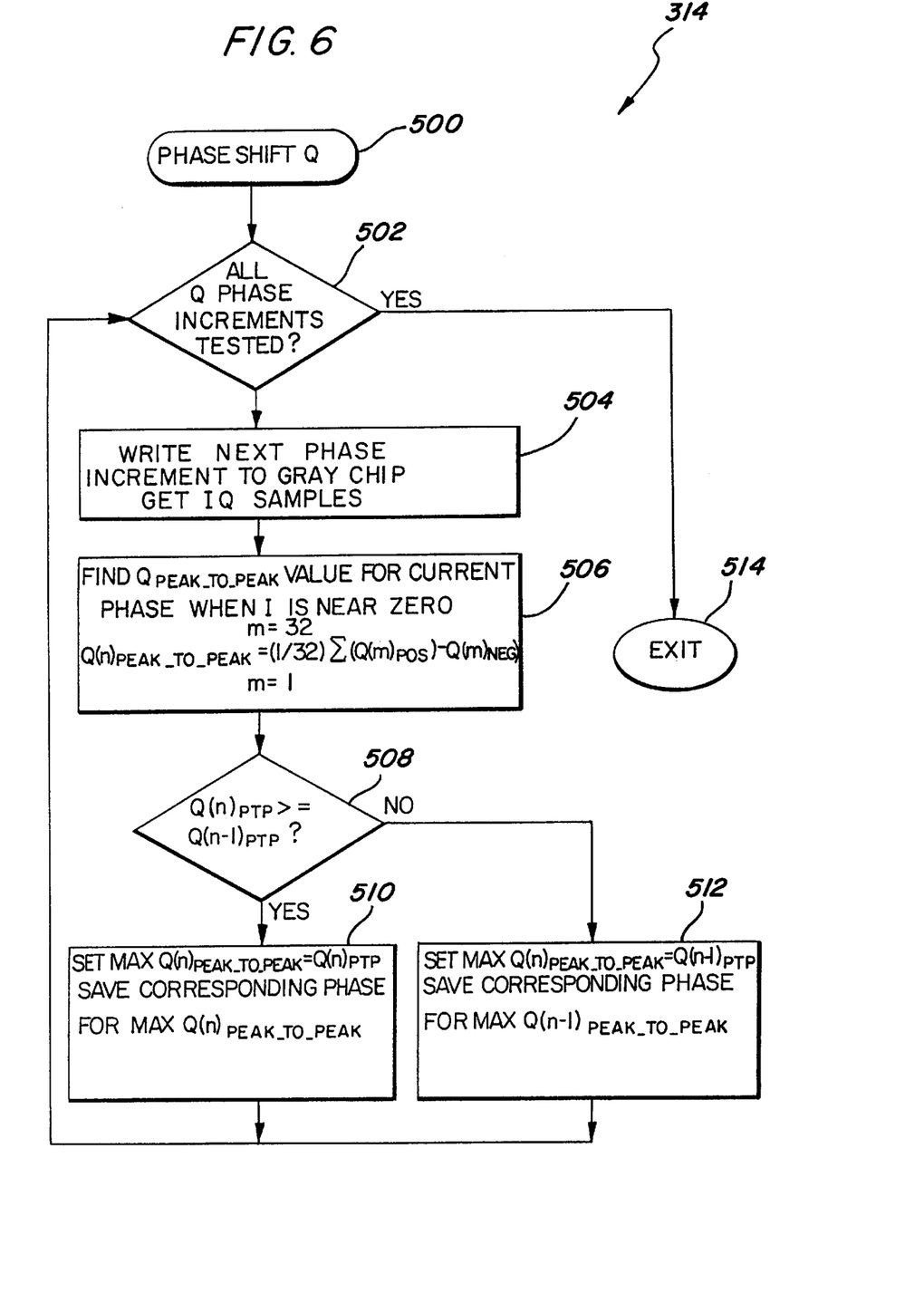
FIG. 6 is a flowchart illustrating the phase shift algorithm for the quadrature phase signal (Q data)

A phase shift algorithm for the in-phase I component is performed at step 312, which is shown in detail in FIG. 5. Similarly, a phase shift algorithm for the Q component is performed at step 314, as shown in FIG. 6. An I/Q balance algorithm is executed at step 316, which is shown in detail in FIG. 8. Steps 308–316 are repeated for each channel, until all the channels have been calibrated. In one embodiment, calibration is performed only at system start-up. In the preferred embodiment, however, the calibration procedure continues for each DDC for as long as the system is operating. This results in a dynamic calibration system which unobtrusively calibrates the system while signal processing functions are unaffected.

Figure 7:
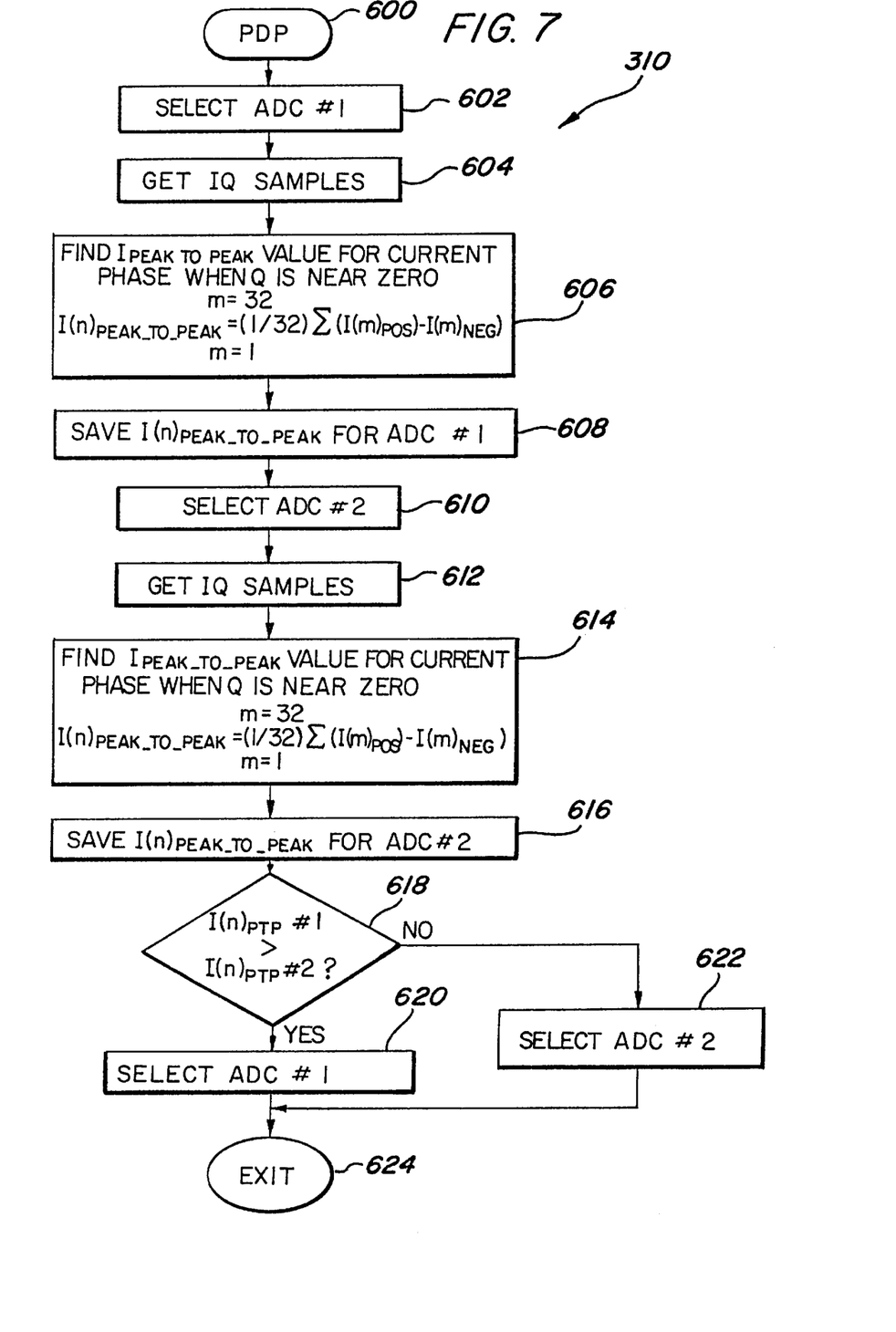
FIG. 7 is a flowchart illustrating the functional flow of the polarization diversity detector (PDD) selection procedure.

The procedure for selecting the best PDD signal (step 310) is illustrated by the flowchart of FIG. 7. At step 602, the first ADC 204a is selected, and I and Q data samples are obtained at step 604. A maximum $I_{peak-to-peak}$ value is calculated at step 606, when Q value is near zero. When Q=0, the $I_{peak-to-peak}$ has maximum value but it is difficult to catch that moment. Therefore, a set of I values is collected of points within an interval around the time when Q=0. There are preferably 32 collected I values when the $I_{peak-to-peak}$ values are at their maximum $I_{peak-to-peak}$ value. These 32 maximum $I_{peak-to-peak}$ values are averaged to determine the average maximum $I_{peak-to-peak}$ value. Similar process may be performed to determine the average maximum $Q_{peak-to-peak}$ value, when needed.

The average maximum $I_{peak-to-peak}$ value determined at step 606 is then stored at step 608. Then the second ADC 204b is selected at step 610. I and Q data samples are then obtained for the second ADC 204b at step 612. Again, an average maximum $I_{peak-to-peak}$ value is calculated at step 614, and this value is stored at step 616. The two stored average maximum $I_{peak-to-peak}$ values are then compared at step 618. The ADC 204 which produces the larger $I_{peak-to-peak}$ value is then selected (steps 620, 622). Since selecting different ADCs 204 will affect the I and Q signal levels symmetrically, only one signal (I or Q) needs to be examined in this procedure. The PDD 200 selection step is performed for each channel separately. Thus, different channels within DDC 208 may actually be using different ADC 204 inputs, which is why each DDC 208 needs to be connected to both ADCs 204.

The phase shift algorithms for the I component (step 312) and the Q component (step 314) are shown in FIGS. 5 and 6, respectively. The purpose of these algorithms is to compensate for the misalignment of the return signal 120 from the laser modules 116, and the internal receiver card 122 local oscillator signal in the DDC 208. The misalignment occurs due to the fact that the laser modules 116 and the receiver card 122 are all run by the same master clock from the frequency synthesizer 142. The adjustment is performed in the DDC 208. The algorithm determines the phase offset values that result in a maximum phase signal (I data) and quadrature phase signal (Q data) for each channel. This is accomplished by successively programming the calibration DDC's phase offset control registers with equal phase increments and reading the corresponding I and Q data from the channel output registers. The I and Q data generated by the calibration DDC 228 are read by the receiver card controller 226 and stored into two separate buffers. Once a sufficient number of data samples has been accumulated, the phase shift algorithm is performed on the I and Q data. The outputs of the phase shift algorithms are an I-phase offset and a Q-phase offset, which are the offsets that result in maximum-amplitude I and Q signals. These optimal offset values are then stored in the associated signal channel DDC.

At step 404 a selected phase increment is stored in the calibration DDC 228, and the I and Q data values are obtained. At step 406 an average maximum peak-to-peak value for I component is calculated. In the present embodiment 32 samples are used, but, depending upon the application, either more or less samples may be used. If the I value calculated at step 406 is greater to or equal to a previously obtained average maximum peak-to-peak value, then a MAX $I(n)_{peak-to-peak}$ variable is set equal to the current I value, and the corresponding phase value is also saved at step 410. Otherwise, at step 412, the MAX I(n) variable is set equal to the previously obtained average maximum peak-to-peak value of I, and the corresponding phase value is saved.

This procedure is repeated at step 402 until all I phase increments have been tested. The resulting MAX I(n) value is then stored into the corresponding DDC chip associated with the current channel. The procedure for determining the Q phase shift value, shown in FIG. 5, is exactly the same as the procedure for determining the I phase shift value, as shown in FIG. 4. These algorithms which provide the calculated phase offsets are utilized to move the starting point of the DDC 208 oscillator signal until it is aligned with the received carrier signal, as it enters the DDC 208, to keep the signals in phase.

Figure 8:
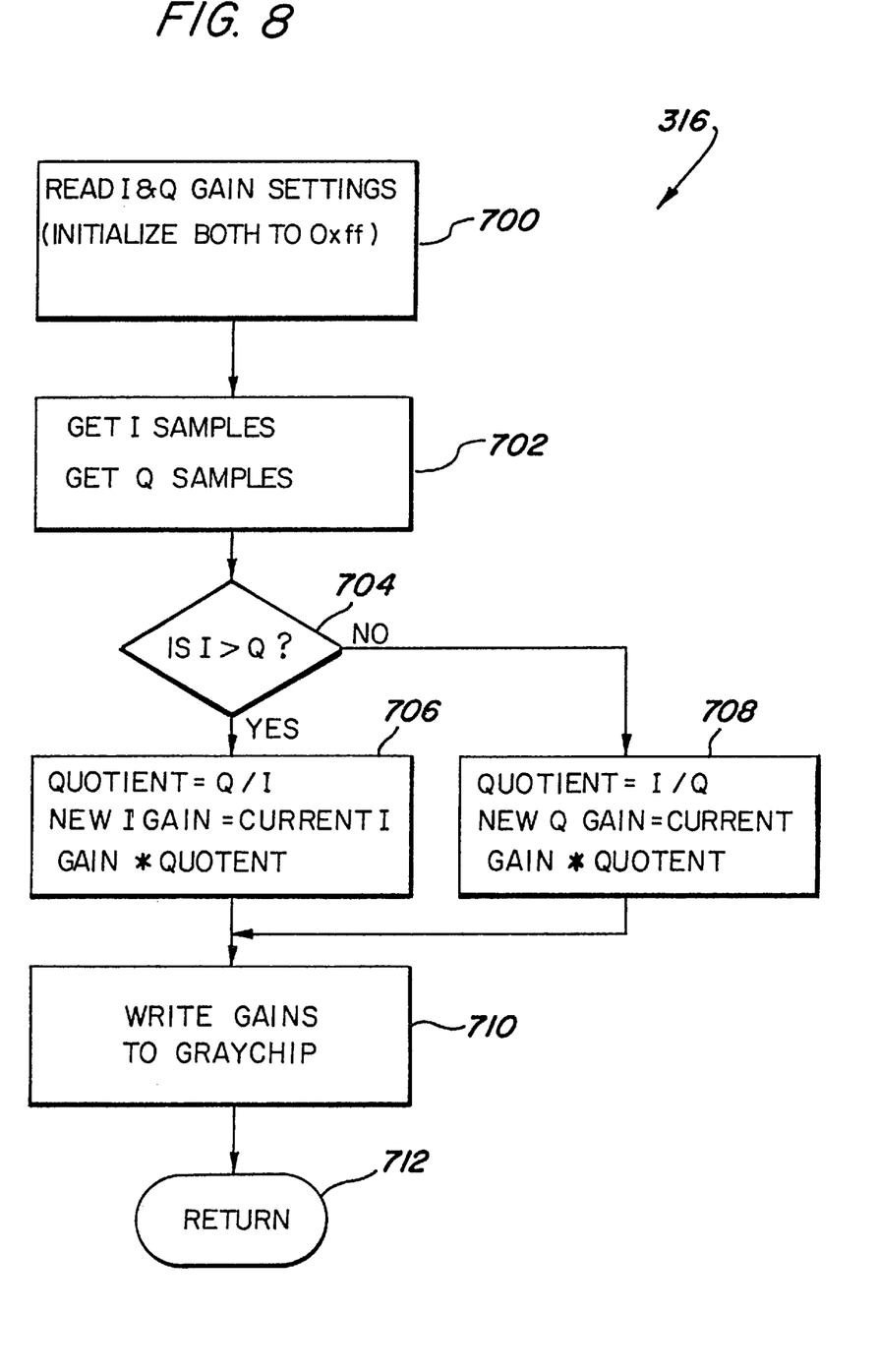
FIG. 8 is a flowchart illustrating the I/Q balance algorithm.

FIG. 8 is a flowchart illustrating the I/Q balance algorithm (step 316 of FIG. 1). This procedure is necessary in order to normalize the maximum I and Q vectors and thus to minimize the errors in phase angle calculations. At step 700, the current I and Q gain settings for the current signal channel are read and the I and Q data samples are obtained for the current channel. At step 704, the I and Q values are compared. If I is greater than Q, then a new I gain is calculated at step 706. The new I gain value is made equal to the current I gain value multiplied by the quotient [Q/I]. If, however, I is not greater than Q, then a new Q gain value is calculated at step 708. The new Q gain value is made equal to the current Q gain value multiplied by the quotient [I/Q]. The determined gain values are then re-written to the DDC 208 of the current signal channel.

In the preferred embodiment, the control signal bus and the data bus for the DDCs 208 are separate. The control signal path between the DDCs 208 and the receiver card controller 226 is a separate bi-directional parallel bus. The data signals are output onto a separate serial bus. By using different buses to move data into and out of the DDCs 208, the background calibration operations are processed in parallel to the high speed signal data process flow. As a result, both high speed signal processing and background calibration processing can occur at the same time. In another embodiment, both signal and control information share the same parallel bus, and, due to throughput limitations on the bus, the calibration routines are run only during startup or when there is a break in normal system operations.

However, the described calibration technique only performs the fine tuning of the receiver card 122 components because its benefits are dependent on the parameters provided to the laser modules 116 during the initialization time. Thus, there is a need for an improved calibration method usable with an inboard receiver with digital demodulation circuit and fiber optic interferometric sensor arrays. Specifically, there is a need for an algorithm for coarse calibration of laser systems, which can be performed during the system initialization time.

OBJECTS AND SUMMARY OF THE INVENTION

It is thus an object of the present invention to provide an apparatus and method for comprehensive calibration of laser modules in a signal processing system.

This and other objects of the present invention may be met by a coarse calibration technique for laser modules of a data acquisition module in a signal processing system. This coarse calibration technique is based on phase modulation of each laser module output signal, controlled by a CPU.

An optimal value of a phase modulation coefficient is calculated for each laser and used as the amplitude of a cosine wave signal for the laser module carrier frequency for phase modulation of the laser output signal. The phase modulation coefficient is determined from a global average I/Q ratio, calculated for all channels of the selected laser module, as an average of all I/Q ratios of in-phase and quadrature phase angle components of the signals returned from the sensors. The phase modulation coefficient for the selected laser module is determined empirically or by dividing the previously determined phase modulation coefficient by the previously determined global average I/Q ratio.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method and apparatus for coarse calibration of laser modules in a data acquisition and signal processing system, based on phase modulation.

The coarse calibration algorithm of the present invention is performed on the laser modules 116 of the inboard receiver 102 system with digital demodulation circuit and fiber optic interferometric sensor arrays 104, as shown in FIG. 1, FIG. 2 and FIG. 3. Preferably, the coarse calibration of the laser modules 116 is controlled by the CPU 130 and is performed only at the system initialization time, in cooperation with the fine tuning calibration method.

At the initialization time, some software code of the coarse calibration algorithm of the present invention, including the data input/output protocol routines, is downloaded from the flash memory 140 of the CPU 130 to other cards of the inboard receiver 102, such as the receiver card 122 and the frequency synthesizer 142. The Frequency Synthesizer 142 includes a processor with the Laser Module Supervisor which sets the laser modules 116 to proper operating optical frequencies and laser module carrier frequencies. The CPU 130 has the rest of the software code with the coarse calibration algorithm. The CPU 130 is interfaced with a system control panel which is operated by a human operator. One of the commands entered by the operator is the inboard receiver commence initialization command. The operator receives the system status report from the CPU 130.

The download of the calibration code to the frequency synthesizer 142 is accomplished via an RS-232 serial line 141. The CPU 130 VME backplane interface 139 is attached via a VME bus 138 to the receiver card VME interface 143, using an IDMA port on the receiver card controller ADSP-2181 card. The VME bus 138 is used for download from the CPU 130 to the receiver card 122 over the VME backplane interface 139.

The initialization of the laser modules 116 is accomplished when the Turn on Laser command is sent from the CPU 130 to the frequency synthesizer 142. For each laser module 116, the set of laser coefficients is read from the laser module 116 EEPROM and sent to the frequency synthesizer 142. The laser coefficients contain data about the allowed and preferred frequency and temperature range for each laser 117. After the verification of the laser modules 116 status, which should have proper voltages and currents, is received in the CPU 130 from the frequency synthesizer 142, the startup of the internal CPU 130 timer is used for the warm-up of the lasers 117.

Each laser 117 powers 56 sensor channels of the array panel 104. The laser 117 crystal is heated to the designated temperature level, provided by a signal from the frequency synthesizer 142, in order to produce a laser optical output sine wave signal with the required "color". The carrier frequency $w_0$ also has to be provided by the frequency synthesizer 142 to the corresponding phase modulator 119a–119h, in the form of a modulating cosine wave signal 99, to modulate the phase of the laser optical output signal 118.

Figure 9:
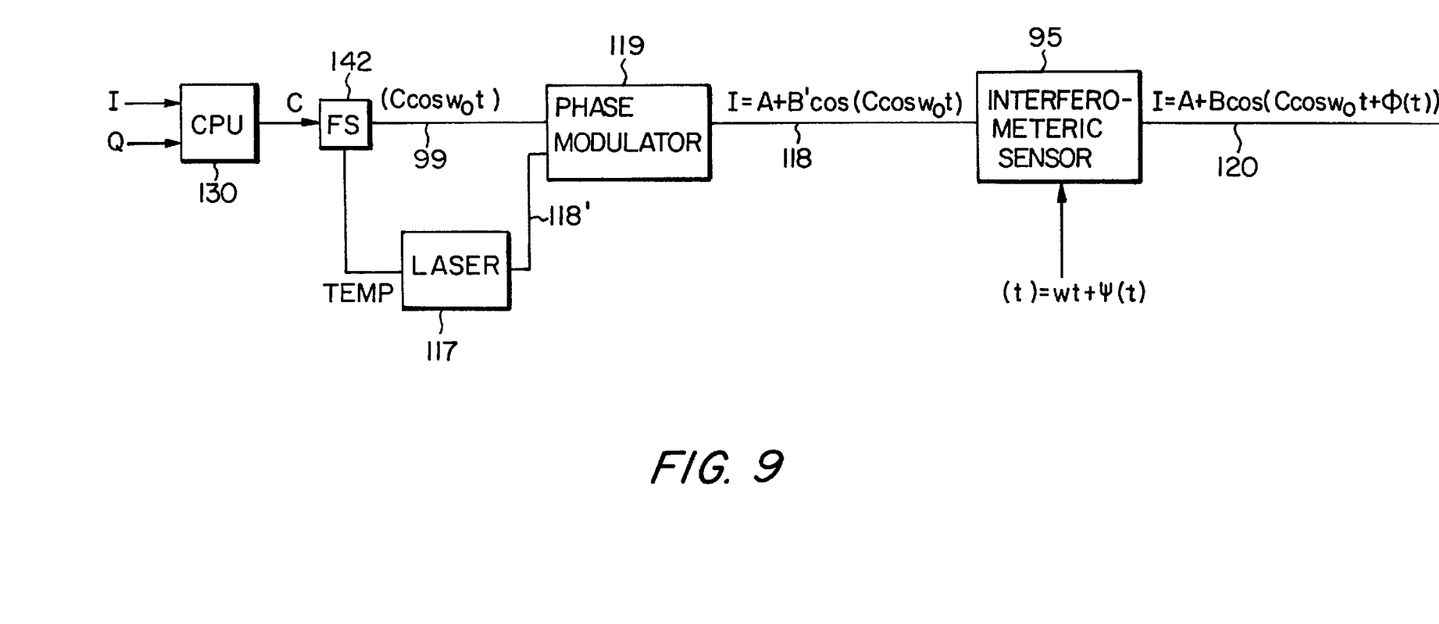
FIG. 9 is a block diagram illustrating a preferred configuration for obtaining coarse calibration of a single laser module, according to the present invention.

FIG. 9 is a block diagram illustrating a preferred configuration for the coarse calibration of a single laser module 116, according to the present invention. The frequency synthesizer 142 controls the operation of each laser 117 by providing, on the amp/freq control line 146 of FIG. 1, the input cosine wave control signal 99 with the laser frequency $w_0$ (cos $w_0$t) to the corresponding phase modulator 119, to modulate the phase of the laser optical output signal 118'. In addition, the frequency synthesizer 142 provides each laser controller card 98, and thus the corresponding phase modulator 119, with the appropriate phase modulation amplitude value "C", to control the phase of each laser optical output signal 118 in the coarse calibration loop of the inboard receiver 102.

The phase modulation amplitude value "C" is calculated in the CPU 130, according to the algorithm described below and shown in FIGS. 11 and 12. Therefore, the signal provided to the phase modulator 119 (C*cos $w_0$t) is used to modulate the phase of the corresponding laser output signal 118 to provide the output light signal 118 with the intensity I=A+B'*cos(C*cos $w_0$t). The phase of this signal is further phase modulated in each interferometric sensor 95 of the array panel 104, as described in the above-mentioned article by Dandridge et al., to obtain the return signal 120 with the intensity I=A+B*cos(C*cos $w_0$t+$\Phi$(t)). Each interferometric sensor 95 introduces the change in intensity from B' to B, dependent on the mixing efficiency of the interferometric sensor 95 and the phase angle $\Phi$(t)=wt+$\Psi$(t).

The I and Q components of the phase angle $\Phi$(t) and their ratio I/Q are determined and optimized for each sensor channel at the appropriate receiver card 122 and receiver card controller 226, as described in the prior art. They are used both in the fine tuning algorithm of the prior art, performed on the receiver card 122, and in the coarse tuning algorithm of the present invention performed in the whole inboard receiver 102.

Figure 10:
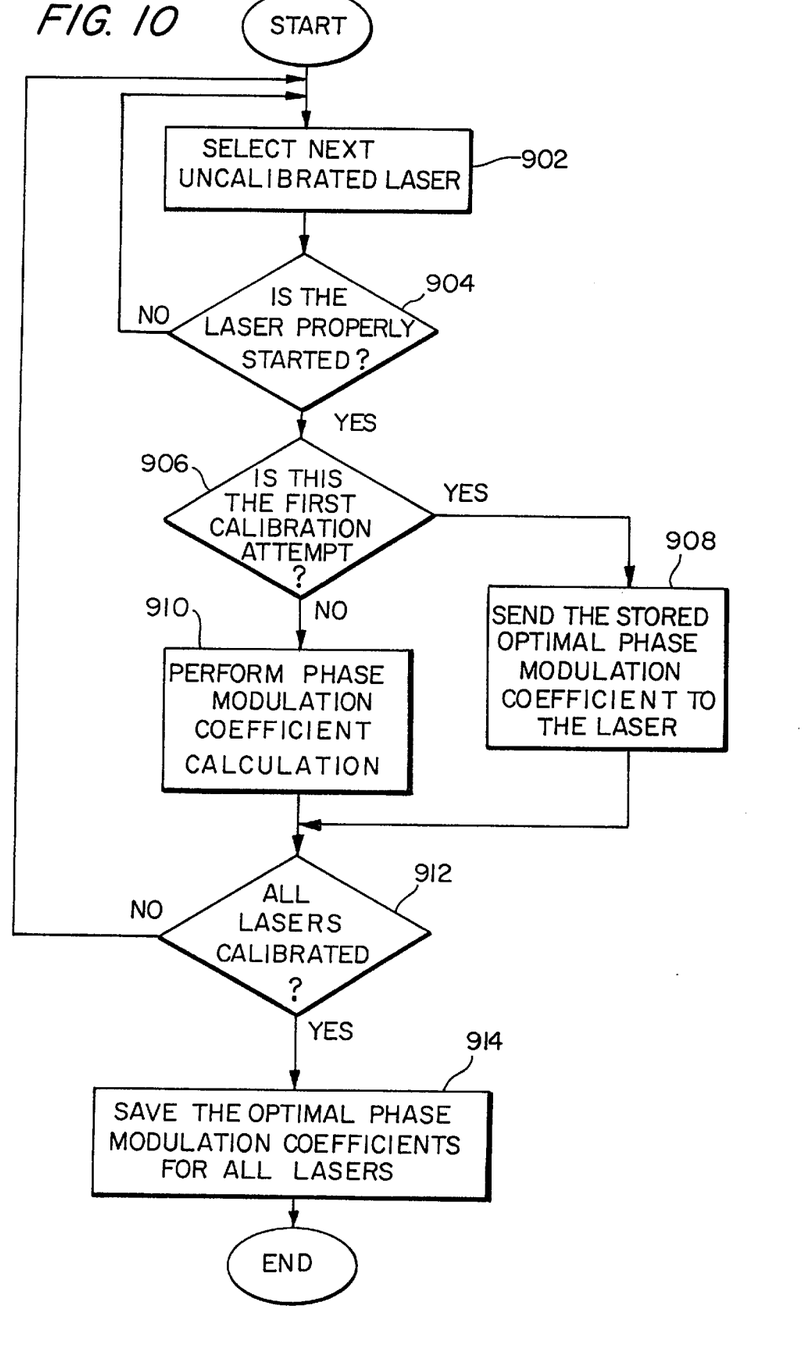
FIG. 10 is a flowchart illustrating the steps of the coarse calibration algorithm, according to the present invention.

FIG. 10 is a flowchart illustrating the steps of the coarse calibration algorithm of the present invention, performed under control of the CPU 130 at the system initialization time. At step 902 the next uncalibrated laser is selected. After it is determined in step 904 that the selected laser is properly started, at step 906 it is verified whether this is the first calibration attempt for the selected laser 117. If it is so, the stored optimum phase modulation coefficient value is sent to the selected laser, via the frequency synthesizer 142, at step 908. Otherwise, the phase modulation coefficient determination routine of FIG. 10 is invoked at step 910. The steps of the coarse calibration algorithm are repeated iteratively for each laser, as long as is needed to obtain the I/Q ratio for each channel as close as possible to 1.0, at which time it is proclaimed at step 912 that all lasers controlled by that CPU are calibrated. At step 914 the optimum values of the phase modulation coefficients for all laser modules controlled by that CPU are stored in the CPU 130 for the next initialization time.

Figure 11:
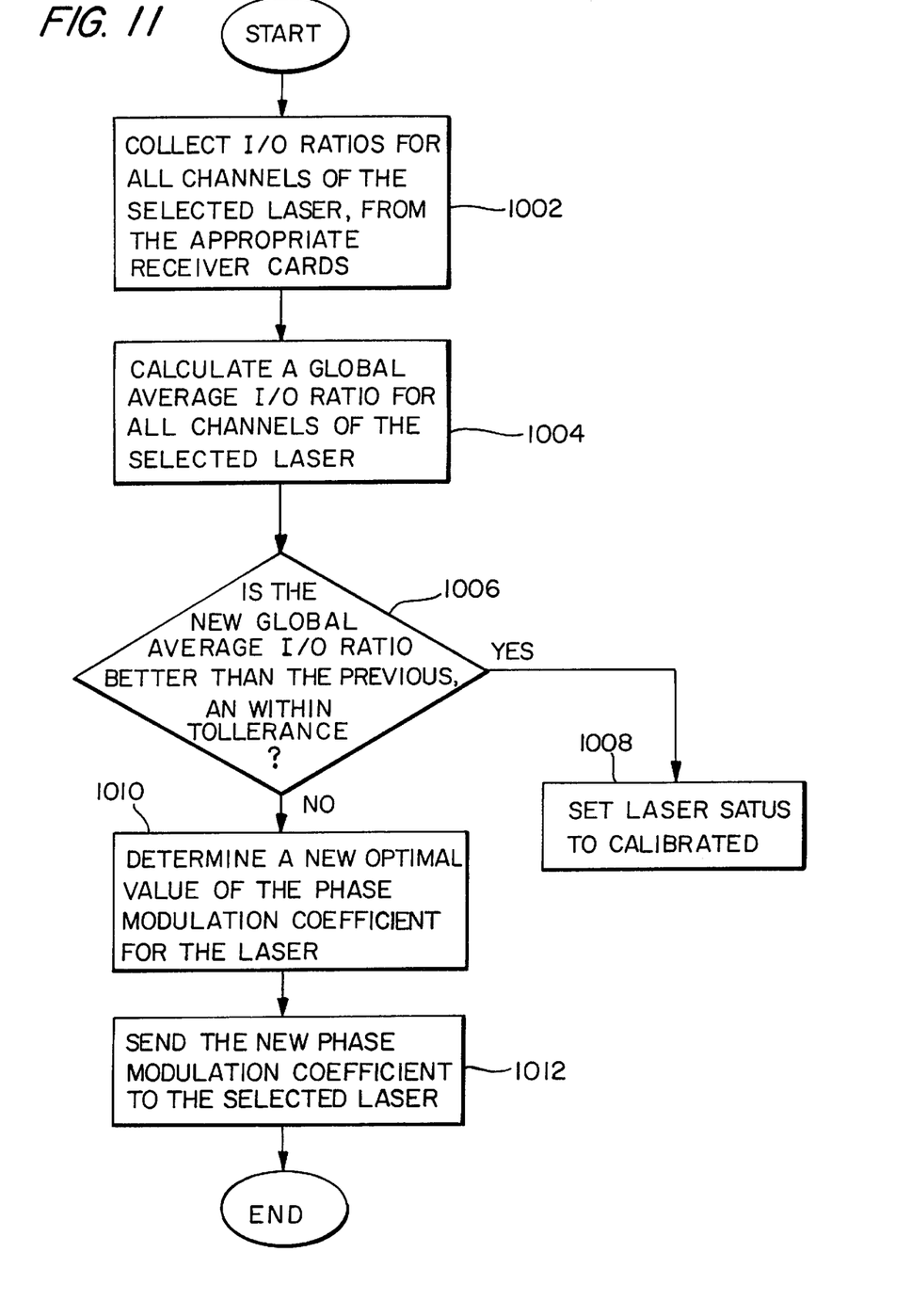
FIG. 11 is a flowchart illustrating the steps of the phase modulation coefficient determination module of the coarse calibration algorithm, according to the present invention.

FIG. 11 is a flowchart illustrating the steps of the phase modulation coefficient determination module of the coarse calibration algorithm, performed for the selected laser according to the present invention. At step 1002 a command is sent to the appropriate receiver card(s) 122 receiver card controller 226 to collect the I/Q ratio value for each channel assigned to the selected laser, calculated from the average maximum $I_{peak-to-peak}$ and average maximum $Q_{peak-to-peak}$ values, and obtained according to the algorithm of FIG. 3. The I/Q ratio is calculated for each channel as a ratio of an average maximum I value (i.e., when Q is near 0) divided by the average maximum Q value (i.e., when I is near 0), where the average I and Q values are taken from a predetermined number of samples for that channel. Therefore, the I/Q values calculated during the fine tuning calibration at the system initialization time, at the appropriate receiver card 122, are sent to the CPU 130 via its VME backplane interface 139.

At step 1004, performed in the CPU 130, the collected values of I/Q ratio for all channels controlled by the selected laser are added, in order to determine a global average I/Q ratio for all the channels controlled by the selected laser. The sensor values which are out of tolerance are discarded. At step 1006 it is verified whether the new global average I/Q ratio is better than the previous global average I/Q ratio. If it is determined that it is better and that the obtained value is close enough to 1.0 (within appropriate tolerance level presently set to 0.01), the laser status is set to the calibrated flag at step 1008 and the routine exits. If it is not better, a new optimum value of the phase modulation coefficient for the selected laser is determined at step 1010 and it is sent to the selected laser at step 1012.

At step 1010, the new optimum value of the phase modulation coefficient for the selected laser may be determined empirically or by calculation. In the preferred embodiment of the present invention this value may be obtained by an appropriate mathematical algorithm performed in the CPU 130. The new value of the phase modulation coefficient, for example, may be calculated by dividing the old value of the phase modulation coefficient by the old value of the global average I/Q ratio.

Therefore, according to the steps of the coarse calibration algorithm of the present invention the CPU 130 determines the optimum value of the phase modulation coefficient for each laser module 116. This coefficient is actually the optimum value of the phase modulation amplitude C of the cosine wave signal 99 supplied to the phase modulator 119 by the frequency synthesizer 142, as shown in FIG. 8. It is possible that each sensor in the array panel 104 receives a slightly different signal from the assigned laser 117, so it is impossible to provide a perfect value for the phase modulation amplitude C which would be ideal for all sensors, but only a value optimal for most sensors. Therefore, each receiver card 122 channel has to be fine tuned, as described in the above mentioned prior art patent applications.

In one embodiment of the present invention each CPU 130 has a memory map from which it is determined which receiver cards 122, controlled by that CPU, are associated with the selected laser module 116. Each CPU 130 preferably controls eight lasers. Ideally, each CPU 130 assists all 56 channels of the laser module 116 when they are all received on the same receiver card 122. However, for practical reasons, in the implementation of the present invention each receiver card 122 assists only 28 channels of each laser module 116. Therefore, each array panel 104 sensor channels are divided between two CPUs and the memory map in this embodiment defines which CPU coarse calibration module would be used to perform the calibration of the whole array panel 104, based on data from the 28 channels assigned to that CPU. It is conceivable, however, that in another embodiment each CPU would calculate its own global average I/Q ratio and that the value closer to 1.0, or the average of the two values, would be chosen to determine the phase modulation amplitude C for that laser.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein. For example, in addition to the above mentioned underwater applications the present invention is also applicable to commercial and military seismic applications.

What is claimed is:

1. A calibration method for laser modules in a signal processing system, comprising the steps of:

selecting a next laser module to be calibrated;

determining if the selected laser module has been calibrated before;

if not calibrated before, sending a saved phase modulation coefficient to the selected laser module to be used for phase modulation of the laser module output signal;

if calibrated before, determining a new phase modulation coefficient to be used for phase modulation of the laser module output signal;

repeating the above steps for each laser module in the signal processing system until all laser modules are calibrated; and saving the new phase modulation coefficients for all laser modules.

2. The method of claim 1, wherein the step of determining the new phase modulation coefficient further comprises the steps of:

obtaining ratios of in-phase and quadrature phase angle components (I/Q) ratios for all channels of the selected laser module;

calculating a new global average I/Q ratio for all channels of the selected laser module as an average of all said I/Q ratios;

comparing the new global average I/Q ratio with the previously determined global average I/Q ratio; and if the new global average I/Q ratio is closer to 1 than the previously determined global average I/Q ratio and within a predetermined tolerance, giving the selected laser module a calibrated status, or if the new global average I/Q ratio is not closer to 1 than the previously determined global average I/Q ratio or not within the predetermined tolerance, determining a new phase modulation coefficient for the selected laser module; and sending the new phase modulation coefficient to the selected laser module to be used for phase modulation of the laser module output signal as the amplitude of a cosine wave signal with the laser module carrier frequency.

3. The method of claim 2, wherein the step of determining the new phase modulation coefficient for the selected laser module performs determination by an empirical method.

4. The method of claim 2, wherein the step of determining the new phase modulation coefficient for the selected laser module further comprises the step of:

obtaining the new phase modulation coefficient by dividing the previously determined phase modulation coefficient by the previously determined global average I/Q ratio.

5. The method of claim 2, wherein the step of obtaining ratios of in-phase and quadrature phase angle components (I/Q ratios) for all channels of the selected laser module further comprises the steps of:

calculating an average maximum value for an in-phase component of a phase angle received for the channel;

calculating an average maximum value for a quadrature component of the phase angle received for the channel;

dividing the calculated average maximum value for the in-phase component of the phase angle with the calculated average maximum value for the quadrature component of the phase angle; and repeating the above steps for each channel of the selected laser module.

6. The method of claim 5, wherein the step of calculating the average maximum value for the in-phase component of the phase angle further comprises the steps of:

obtaining a plurality of maximum peak-to-peak values of the in-phase component, taken when the quadrature component is near or at zero; and calculating the average maximum value for said in-phase component from the plurality of maximum peak-to-peak values of the in-phase component.

7. The method of claim 5, wherein the step of calculating the average maximum value for the quadrature component of the phase angle further comprises the steps of:

obtaining a plurality of maximum peak-to-peak values of the quadrature component, taken when the in-phase component is near or at zero; and calculating the average maximum value for said quadrature component from the plurality of maximum peak-to-peak values of the quadrature component.

8. An apparatus for calibrating a signal processing system, the apparatus comprising:

at least one laser module sending an output light signal to an associated array of sensor channels;

at least one receiver for receiving return signals from each of the sensor channels, the return signals having an in-phase component and a quadrature component of a phase angle;

a system processor for receiving the return signals from the sensor channels and determining a phase modulation coefficient for the laser module; and a phase modulator for receiving a cosine wave signal at the carrier frequency and the amplitude equal to the phase modulation coefficient, the cosine wave signal used for phase modulation of the laser module optical output signal.

9. The apparatus of claim 8 wherein said phase modulation coefficient is dependent on a global average I/Q ratio, calculated for all the sensor channels of the laser module, wherein said global average I/Q ratio is calculated as an average of the ratios of the in-phase and quadrature phase angle component (I/Q) received for all sensor channels of the laser module.

10. The apparatus of claim 9 wherein said phase modulation coefficient is determined empirically.

11. The apparatus of claim 9 wherein said phase modulation coefficient is calculated by dividing the previously determined phase modulation coefficient by the previously determined global average I/Q ratio.

12. The apparatus of claim 9 wherein each said ratio of in-phase and quadrature phase angle component (I/Q ratio) is determined in the appropriate receiver, which calculates an average maximum value for an in-phase component of a phase angle and divides it with an average maximum value for a quadrature component of the phase angle.

13. The apparatus of claim 12, wherein the average maximum value for the in-phase component of the phase angle is calculated as an average of a plurality of maximum peak-to-peak values of the in-phase component, taken when the quadrature component is near or at zero, and the average maximum value for the quadrature component of the phase angle is calculated as an average of a plurality of maximum peak-to-peak values of the quadrature component, taken when the in-phase component is near or at zero.

* * * * *